(12) United States Patent
Yonezawa

(10) Patent No.: US 6,313,952 B1
(45) Date of Patent: Nov. 6, 2001

(54) ADAPTER LENS SYSTEM FOR A GREENOUGH-TYPE STEREOMICROSCOPE

(75) Inventor: Yasuo Yonezawa, Zushi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/394,740

(22) Filed: Sep. 13, 1999

(30) Foreign Application Priority Data

Sep. 14, 1998 (JP) ................................................ 10-276399

(51) Int. Cl.⁷ .......................... G02B 21/02; G02B 21/22
(52) U.S. Cl. ...................... 359/661; 359/376; 359/377; 359/378; 359/380; 359/672; 359/676
(58) Field of Search ..................................... 359/377, 378, 359/380, 381, 661, 672, 675, 676, 376

(56) References Cited

U.S. PATENT DOCUMENTS

| | | | |
|---|---|---|---|
| 5,227,914 | * | 7/1993 | Hanzawa et al. ................... 359/377 |
| 5,331,457 | * | 7/1994 | Hanzawa et al. ................... 359/377 |
| 5,701,196 | * | 12/1997 | Nakamura .......................... 359/362 |

* cited by examiner

Primary Examiner—Evelyn A Lester

(57) ABSTRACT

An adapter lens for a Greenough-type stereomicroscope (SM1), the adapter comprising a negative lens group (4) and a positive lens group (5) along an optical axis (AX3). The adapter lens attaches to the objective lens side of the Greenough-type stereomicroscope. Variation of the distance (D54L, D54H) between the positive and the negative lens group allows an operator of the stereomicroscope to position the eye pieces (8 and 8') of the stereomicroscope to a comfortable height for ease of use.

6 Claims, 6 Drawing Sheets

ADAPTER LENS SYSTEM FOR A GREENOUGH-TYPE STEREOMICROSCOPE

FIELD OF THE INVENTION

The present invention relates to a stereomicroscope, and in particular to an adapter lens system for a Greenough-type stereomicroscope.

BACKGROUND OF THE INVENTION

A stereomicroscope permits observation with the same three-dimensional comprehension as that provided by both eyes while a solid object is being observed. Therefore, it is easy to obtain a perspective relation between a tool, such as tweezers, and an object while working in an image field of a stereomicroscope. Thus, a stereomicroscope is especially effective in applications requiring minute manipulation such as precision machining, dissection in biological research and surgical operations. To obtain parallax for three-dimensional comprehension with a stereomicroscope, portions of the optical elements through which light rays pass to enter into both right and left eyes of the observer are independent of each other. The two rays which enter both eyes are made to intersect in the plane of the object being observed. The enlarged images viewed from different directions are formed and are observed through the eyepieces of the microscope, allowing stereovision of a small object under observation. This type of stereomicroscope is known as "Greenough-type" stereomicroscope. The Greenough-type stereomicroscope is one of the standard stereomicroscopes used for obtaining a stereovision of an object.

FIG. 4 is a schematic diagram of a Greenough-type stereomicroscope SM1 according to related art. Stereomicroscope SM1 comprises an optical system OSR for the right eye and the optical system OSl for the left eye. The respective optical axes AX1 and AX2 of optical systems OSL and OSR are arranged at a predetermined angle θ and intersect at optical axis AX0 bisecting optical axes AX1 and AX2. An image of an object 1 arranged at the intersection of optical axes AX1 and AX2 is formed at positions 7 and 7' by imaging lenses (usually zoom lens) 6 and 6' having a magnification β. The magnification B of optical systems OSL and OSR from object 1 to images 7 and 7' is β. Images 7 and 7' are then magnified respectively by eyepiece lenses 8 and 8', and are observed by the naked eyes of an operator (not shown) of the microscope placed at eyepoint positions 9 and 9' respectively.

In a Greenough-type stereomicroscope, for an individual to observe an object in a free and comfortable posture, it is necessary to change the position of eye-points 9 and 9' of the eyepiece along respective optical axes AX1 and AX2, to the eye-level of the observer, which in part depends on the height of the observer. To raise the eye-level, the distance between object 1 and eye-points 9 and 9' needs to increase. On the other hand, to lower the eye-level, the distance between object 1 and eye-points 9 and 9' needs to decrease. In a Greenough-type stereomicroscope, use of an auxiliary objective lens is a known method for changing the eye-level. FIGS. 5 and 6 demonstrate the known method of changing eye-level using an auxiliary objective lens. The stereomicroscopes in FIGS. 5 and 6 are constructed the same as that in FIG. 4 and the same reference numbers are used to identify parts equivalent to those in FIG. 4.

FIG. 5 provides a schematic diagram of the optical system using, the currently known method for raising the eye-level of a Greenougih-type stereomicroscope. As depicted in FIG. 5, by inserting an auxiliary objective lens 14 (shown as a negative lens) between object 1 and imaging lenses 6 and 6', the distance from object 1 to the imaging lenses is extended and the eye-level is raised. In FIG. 5, P1 denotes the position of object 1 when auxiliary objective lens 14 is not inserted, and P3 denotes the position of the object when the auxiliary objective lens is inserted. Also, D41 denotes the axial distance between object 1 at position P1 and a principal plane 14$h$ (principal point) when auxiliary objective lens 14 is not inserted. D43 denotes the distance between position P3 of object 1 and principal plane 14$h$ (principal point) when auxiliary objective lens 14 is inserted. D13 denotes the distance between position P1 of object 1 when auxiliary objective lens 14 is not inserted, and position of P3 when auxiliary objective lens 14 is inserted. Since auxiliary objective lens 14 is inserted between object 1 and imaging lenses 6 and 6', the distance from the object to imaging lenses 6 and 6' is extended by moving the position of the object observed from position P1 to P3, raising the eye-level. In this configuration, the eye-level is raised by the amount D13 by inserting auxiliary objective lens 14. Position P1 and P3 are along optical axis AX0.

The magnification βa of auxiliary objective lens 14 is determined by the following equation:

$$\beta a = (D41/D43) < 1.$$

The magnification B from object 1 at position P3 to images 7 and 7' is given as:

$$B = \beta a \times \beta.$$

FIG. 6 is a schematic diagram showing the currently known optical system used in stereomicroscope SM1 for lowering the eye-level. As depicted in FIG. 6, an auxiliary objective lens 15 (shown as positive lens) is inserted between object 1 and imaging lenses 6 and 6'. This decreases the distance from object 1 to imaging lenses 6 and 6', thus lowering the eye-level. In FIG. 6, P1 denotes the position of object 1 when auxiliary objective lens 15 is not inserted, and P3 denotes the position of the object when auxiliary objective lens 15 is inserted. D41 denotes the distance between object 1 at position P1 and a principal plane 15$h$ (principal point) when auxiliary objective lens 15 is not inserted. D43 denotes the distance between object 1 at position P3 and principal plane 15$h$ (principal point) when auxiliary objective lens 15 is inserted. D31 denotes the distance between the position P1 of object 1 when the auxiliary objective lens 15 is not inserted and position P3 of the object when auxiliary objective lens 15 is inserted. When auxiliary objective lens 15 (positive lens) is inserted between object and imaging lenses 6 and 6', the distance from the object to the imaging lenses is decreased, lowering, the eye-level. In this configuration, the eye-level can be lowered by the amount of D31 by inserting auxiliary objective lens 15.

The magnification βa of auxiliary objective lens 15 is determined by the following equation:

$$\beta a = (D41/D43) > 1.$$

The magnification B from the object 3 to the images 7 and 7' is given by:

$$B = \beta a \times \beta.$$

As is described above, according to related art, to adjust the eye-level either up or down to the height of an observer looking through the Greenough-type stereomicroscope, one must change the auxiliary objective lens each time. This is cumbersome, prevents quick observations in different positions, and disrupts careful observations, as changing the auxiliary lenses can jar the object under observation.

SUMMARY OF THE INVENTION

It is a goal of the present invention, in view of the above problems, to provide an Greenough-type stereomicroscope having a simple construction which provides a user of the microscope with the ability to change eye-level over a continuous range of positions during use of the microscope without interruption.

It is yet another goal of the present invention to provide an adapter lens for a stereomicroscope which can be attached to the objective lens side of the microscope, allowing the user of the microscope to adjust the height of the eye pieces, while continuing observations with the microscope without changing lenses.

The present invention accomplishes these and other goals by providing an adapter lens attachable to an objective lens side of a Greenough-type stereo microscope, the adapter lens having in order from the Greenough-type stereo microscope's objective lens side, a first lens having positive refracting power and a second lens having negative refracting power. The distance between the first lens and the second lens can be varied allowing the level of the eyepieces to be changed with respect to an object under observation continuously between a first position and a second position.

An additional aspect of the present invention provides an adapter lens in which the first position is a high-eye-level position the second position is a low-eye-level position. The high-eye-level position is an eye point position along the optical axes of the eye-pieces when the eye pieces arc placed at the farthest position from the object to be observed. The low-eye-level position is an eye point position along the optical axes of the eye-pieces when the eye pieces are placed at the nearest position from the object to be observed.

In a further aspect of the invention, the adapter lens satisfies the following conditions: at the low-eye-level position:

$\beta 4L \times \beta 5L > 1$ and $D54L + D51L/(\beta 4L \times \beta 5L) - D54L/\beta 4L - D51L < 0$, and at the high-eye-level position:

$\beta 4H \times \beta 5H < 1$, and $D54H + D51H/(\beta 4H \times \beta 5H) - D54H/\beta 4H - D51H > 0$.

The reference symbols denoting the following: $\beta 4L$ represents a magnification of the second lens at the low-eye-level position; $\beta 5L$ represents a magnification of the first lens at the low-eye-level position; $\beta 4H$ represents a magnification of the second lens at the high-eye-level position; $\beta 5H$ represents a magnification of the first lens at the high-eye-level position; D54L represents a distance between a principal plane of the first lens and a principal plane of the second lens at the low-eye-level position; D54H represents a distance between a principal plane of the first lens and a principal plane of the second lens at the high-eye-level position; D51L represents a distance between a principal plane of the first lens at the low-eye-level position and an object position of the Greenough-type stereomicroscope without equipping same with the adapter lens; and D51H represents a distance between a principal plane of the first lens at the high-eye-level position and an object position of the Greenough-type stereomicroscope without equipping same with the adapter lens.

In yet a further aspect of the present invention, the adapter lens as described above, satisfies the following conditions: at the high-eye-level position: $|f4|/f5 < 1$, and at the low-eye-level position: $|f4|/f5 > 0.25$, wherein f5 is the focal length of the first lens and f4 is the focal length of the second lens.

Another aspect of the method of the present invention includes the further step of positioning the at least one positive lens and at least one negative lens in a moveable relationship with each other to allow the position of the eye point level to be varied continuously by moving the at least one positive and one negative lens with respect to each other. Thus, the eye point level can be positioned at any point between a high-eye-level position where the eye piece are at a maximum distance from the object being observed to a low-eye-level position here the eye pieces are at a minimum distance from the object being observed.

DETAILED DESCRIPTION OF THE INVENTION

Figure 1A:
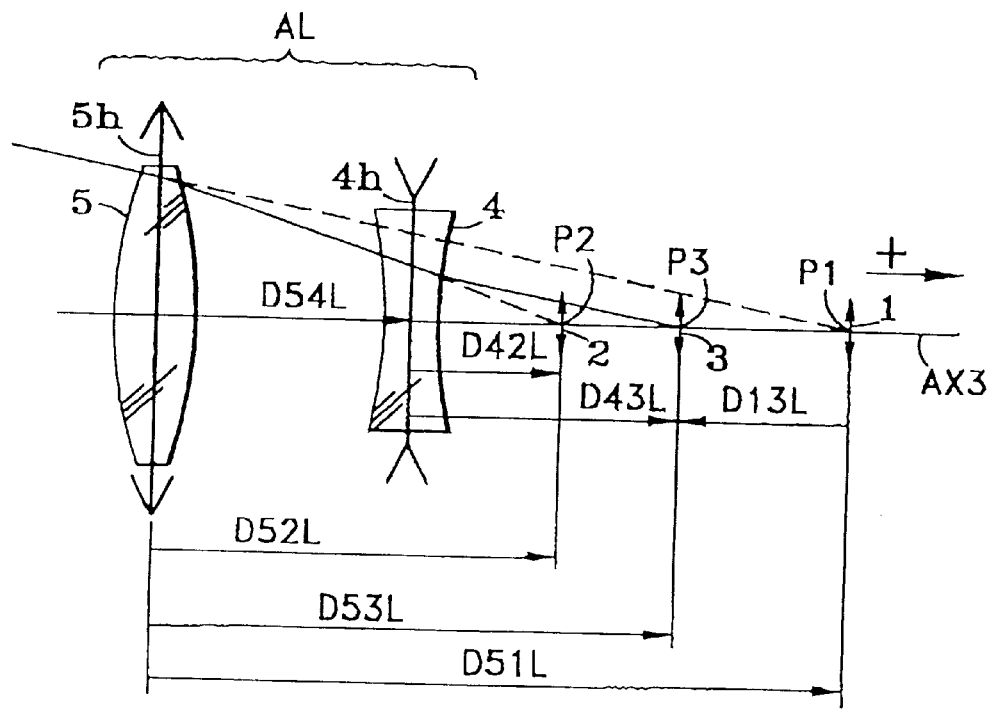
FIG. 1A is a schematic diagram of the optical design of the adapter lens system of the present invention for the Greenough-type stereomicroscope positioned for observation at the low-eye-level position.
Figure 1B:
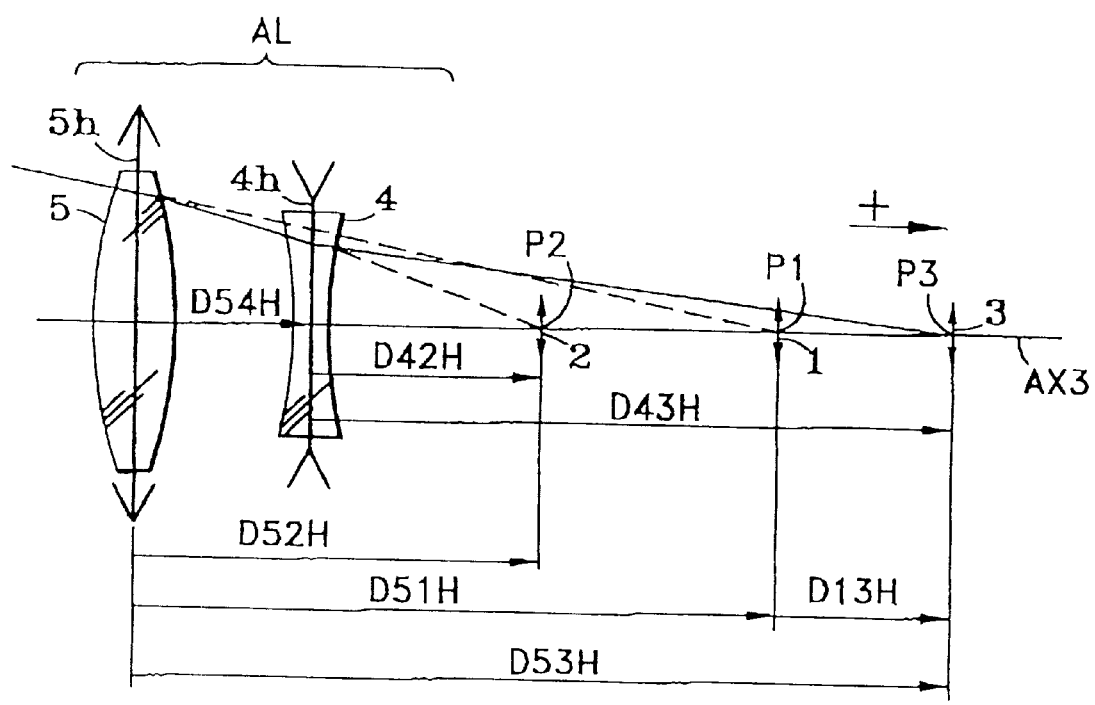
FIG. 1B is a schematic diagram of the optical design of the adapter lens of the present invention for the (Greenough-type stereomicroscope positioned for observation at the high-eye-level position.

The present invention will be described in detail below in accordance with the embodiment shown in FIGS. 1A, 1B, 2 and 3. FIGS. 1A and 1B illustrate the concept of raising and lowering the eye-level of the Greenough-type stereomicroscope by inserting an adapter lens system AL, according to the present invention. The high-eye-level position is the state where the eye-level is raised to the highest position possible with the adapter lens system AL of the present invention. The low-eye-level position is the state where the eye-level is lowered to the lowest position possible with the aid of the adapter lens AL of the present invention. FIG. 1A shows the adapter lens AL situated in the low-eye-level position and FIG. 1B shows the adapter lens Al situated in the high-eye-level position. In FIGS. 1A and 1B, the positive sign means that the distance is measured in the direction the arrow points.

With reference to FIGS. 1A and 1B, adapter lens AL of the preferred embodiment comprises, along an optical axis AX3, a lens group having a combination of a negative lens 4 and a positive lens 5 having principal planes 4*h* and 5*h*, respectively. The position of an object 1 under observation is moved from a position P1 to a position P3 along optical axis AX3 when adapter lens AL is attached to the Greenough-type stereomicroscope (not shown). A virtual image 2 of object 3 at position P3 is formed at position P2 by negative lens 4. D51L represents the distance between principal plane 5*h* and object 1 at position P1 at the low-eye-level position. D52L represents the distance between principal plane 5*h* and virtual image 2 at position P2 at the low-eye-level position. D53L, represents the distance between principal plane 5*h* and object 3 at position P3 at the low-eye-level position. D54L represents the distance between principal plane 5*h* and principal plane 4*h* of negative lens 4 at the low-eye-level position. D42L represents the distance between principal plane 4*h* and virtual image 2 at position P2 at the low-eye-level position. D43L represents the distance between principal plane 4*h* and object 3 at position P3 at the low-eye-level position. D13L represents the distance between object 1 at position P1 and object 3 at P3 at the low-eye-level position.

With reference to FIG. 1B, D51H represents the distance between the principal plane 5*h* and object 1 at position P1 at the high-eye-level position. D52H represents the distance between principal plane 5*h* and virtual image 2 at position P2 at the high-eye-level position. D53H represents the distance between principal plane 5*h* and object 3 at position P3 at the high-eye-level position. D54H represents the distance between principal plane 5*h* and principal plane 4*h* at the high-eye-level position. D42H represents the distance between principal plane 4*h* and virtual image 2 at position P2 at the high-eye-level position. D43H represents the distance between principal plane 4*h* and object 3 at position P3 at the high-eye-level position. D13H represents the distance between object 1 at position P1 and the object 3 at position P3 at the high-eye-level position.

In comparing FIGS. 1A and 1B, it will be apparent that the magnification, especially that of the negative lens 4, varies continuously in accordance with the change in the distance between principal planes 5*h* and 4*h*. Therefore, the eye-level can be varied continuously by varying the position of object 3 at position P3 continuously while the adapter lens AL is attached.

In a preferred embodiment of the present invention, the following condition (1) is preferably satisfied:

$$\beta 4L \times \beta 5L > 1, \quad (1)$$

where $\beta 4L$ and $\beta 5L$ represent the respective magnifications of negative lens 4 and positive lens 5 at the low-eye-level position. $\beta 4L$ and $\beta 5L$ are defined by the following equations:

$$\beta 4L = D42L/D43L \quad (a)$$

$$\beta 5L = D51L/D52L \quad (b)$$

Condition (1) represents the preferred range of the magnification of adapter lens AL at the low-eye-level position. Magnification $\beta 4L \times \beta 5L$ is greater than 1, i.e. adapter lens AL in this position increases somewhat the overall magnification of the system.

In the present invention the following condition (2) is also preferably satisfied:

$$\beta 4H \times \beta 5H < 1, \quad (2)$$

where $\beta 4H$ and $\beta 5H$ represent the respective magnifications of negative lens 4 and positive lens 5 at the high-eye-level position. $\beta 4H$ and $\beta 5H$ are defined by the following equations:

$$\beta 4H = D42H/D43H \quad (c)$$

$$\beta 5H = D51H/D52H \quad (d)$$

Condition (2) represents the preferred range of the magnification of adapter lens AL at the high-eye-level position. Magnification $\beta 4H \times \beta 5H$ is smaller than 1. Conditions (1) and (2) show that the magnification of adapter lens AL can provide a magnification of 1.

It is desirable that the present invention also satisfy the following condition:

$$D54L + D51L/(\beta 4L \times \beta 5L) - D54L/\beta 4L - D51L < 0 \quad (3).$$

Condition (3) represents the preferred range (D13L in FIG. 1A) of the position of object 1 at the low-eye-level position when adapter lens AL is inserted.

It is desirable that the present invention also satisfy the following condition:

$$D54H + D51H/(\beta 4H \times \beta 5H) - D54H/\beta 4H - D51H > 0 \quad (4).$$

Condition (4) represents the preferred range (D13H in FIG. 1B) of the position of object 1 at the high-eye-level position while adapter lens AL is attached.

Conditions (3) and (4) show that the adjustable range of the eye-level using adapter lens AL includes the eye-level when adapter lens AL is not attached. The meaning of conditions (3) and (4) is described below.

In FIGS. 1A and 1B, if the conditions (D13L<0, D13H>0) are satisfied, then: 1) the eye-level at the low-eye-level position will extend to a lower position than the eye-level when adapter lens AL is not attached by the amount of D13L; 2) the eye-level at the high-eye-level position will also extend to a higher position than the eye-level when adapter lens AL is not attached by the amount of D13H; and 3) the eye-level when adapter lens AL is not attached is included in the variable range of the eye-level.

It will now be verified by mathematical proof that the left side of the condition (3) is equal to D13L.

In FIG. 1A, the following equation (e) is satisfied:

$$D13L = D53L - D51L \quad (e).$$

Equation (b) can be modified equation (b'):

$$D52L = D51L/\beta 5L \quad (b').$$

From FIG. 1A and equation (b'), the following equation (f) is derived:

$$D42L = D52L - D54L$$

$$= D51L/\beta 5L - D54L \quad (f).$$

From equations (a) and (f), equation (g) is derived:

$$D43L = D42L/\beta 4L$$

$$= (D51L/\beta 5L - D54L)/\beta 4L \quad (g).$$

From FIG. 1A, equation (h) is also derived:

$$D53L = D54L + D43L \quad (h).$$

From equations (e), (g), and (h), the following equation (i) is derived:

$$D13L = D54L + D51L/(\beta 4L \times \beta 5L) - D54L/\beta 4L - D51L \quad (i).$$

Thus, D13L is equal to the left side of condition (3). Moreover, from FIG. 1B, it is possible to prove that D13H is equal to the left side of the condition (4), in the same way that D13L was shown to be equal to the left side of the condition (3), as described above. Since such a proof that D13H is equal to the left side of the condition (4) is equivalent to the foregoing proof involving D13L, a detailed description is omitted.

As is described above, if the conditions (1), (2), (3), or (4) are satisfied, the variable range of the magnification, has a range from the magnification $\beta 4H \times \beta 5H$ at the high-eye-level position to the magnification $\beta 4L \times \beta 5L$ at the low-eye-level position.

The variable range of the eye-level includes the eye-level when adapter lens AL is not attached. Moreover, based on the eye-level when adapter lens AL is not attached, the eye-level can be varied within the range from the low-eye-level position to the high-eye-level position, that is from D13L to D13H.

It is advantageous for the present invention to satisfy condition (5):

$$|f4|/f5<1, \tag{5}$$

where f4 and f5 respectively represent the focal length of negative lens 4 and positive lens 5.

Condition (5) verifies the relation that if the distance D54H between principal plane of the first lens group (positive lens 5) and that of the second lens group (negative lens 4) at high-eye-level position is positive, that D13H consequently becomes a positive value, thus raising the eye-level. To make D13H positive under the condition of D54H=0, the composite focal length F of positive lens 5 and negative lens 4 should be negative, as indicated by the following equation:

$$F=(f4 \times f5)/(f4+f5)<0. \tag{j}$$

According to the present invention, focal length f4 of negative lens 4 is negative and focal length f5 of the positive lens 5 is positive. Accordingly, if condition (5) is satisfied, f4+f5 can be positive (>0). However, if the upper limit of condition (5) is exceeded, to satisfy the condition (5), the distance D54H between principal plane 5h of the first lens group and principal plane 4h of the second lens group becomes negative, and such a lens configuration becomes impossible under the current circumstances.

WORKING EXAMPLE

Figure 2:
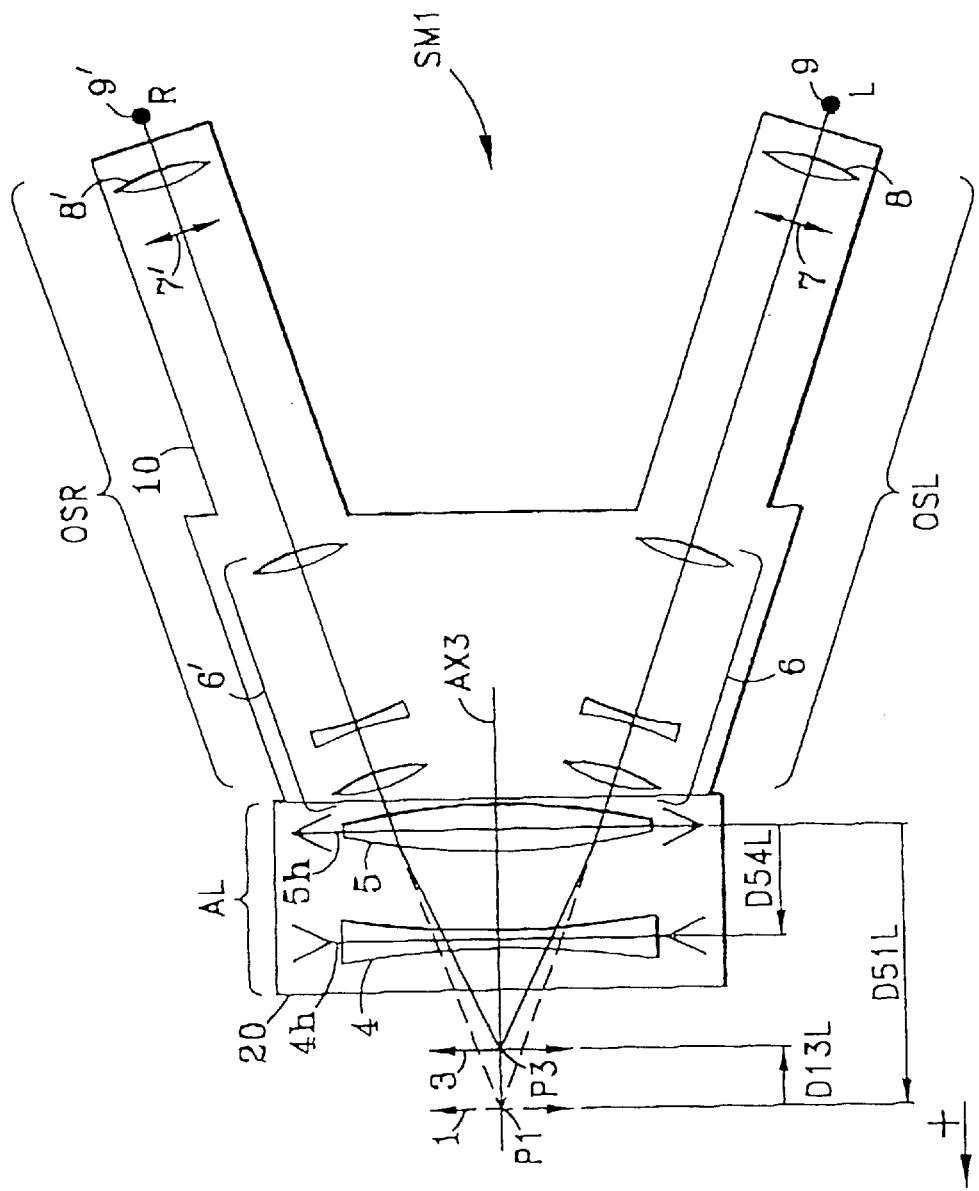
FIG. 2 is a cross-sectional view of the optical design of the adapter lens according to the present invention attached to the Greenough-type stereomicroscope, the adapter lens being adjusted for observation at the low-eye-level position.
Figure 3:
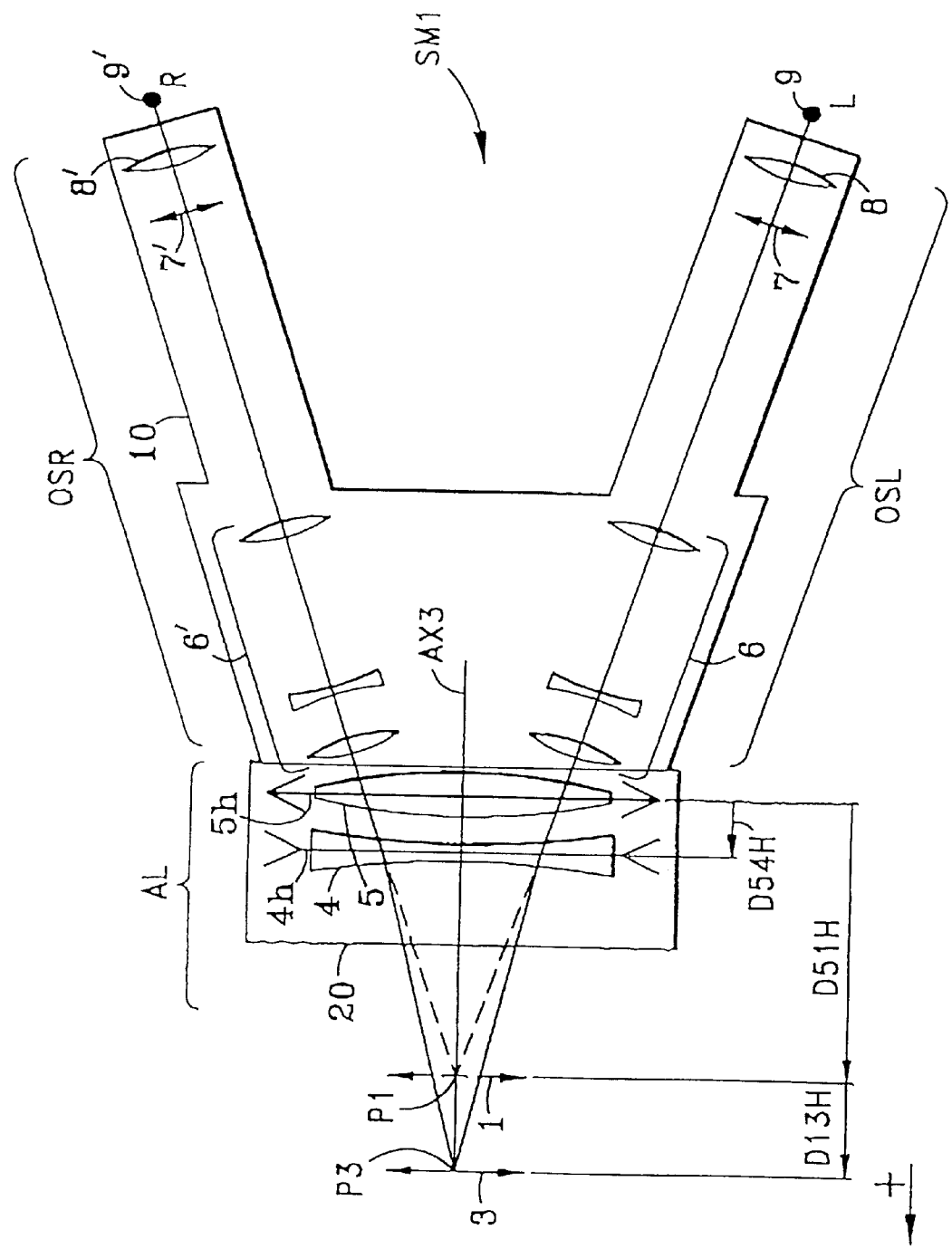
FIG. 3 is a cross-sectional view of the optical design of the adapter lens according to the present invention attached to the Greenough-type stereo microscope, the adapter lens being adjusted for observation at the high-eye-level position.
Figure 4:
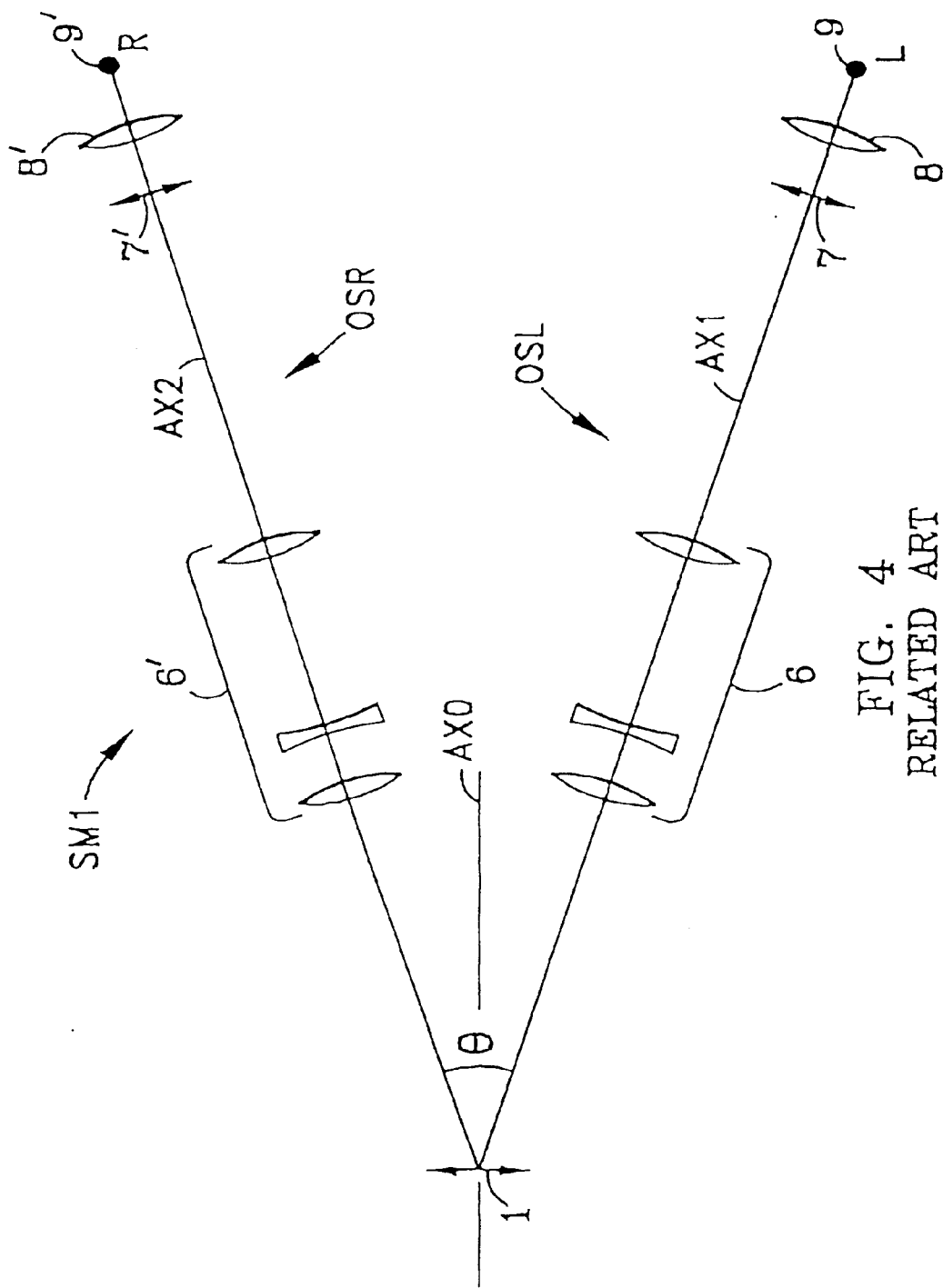
FIG. 4 is a cross-sectional view of the standard optical design of a related art Greenough-type stereomicroscope.
Figure 5:
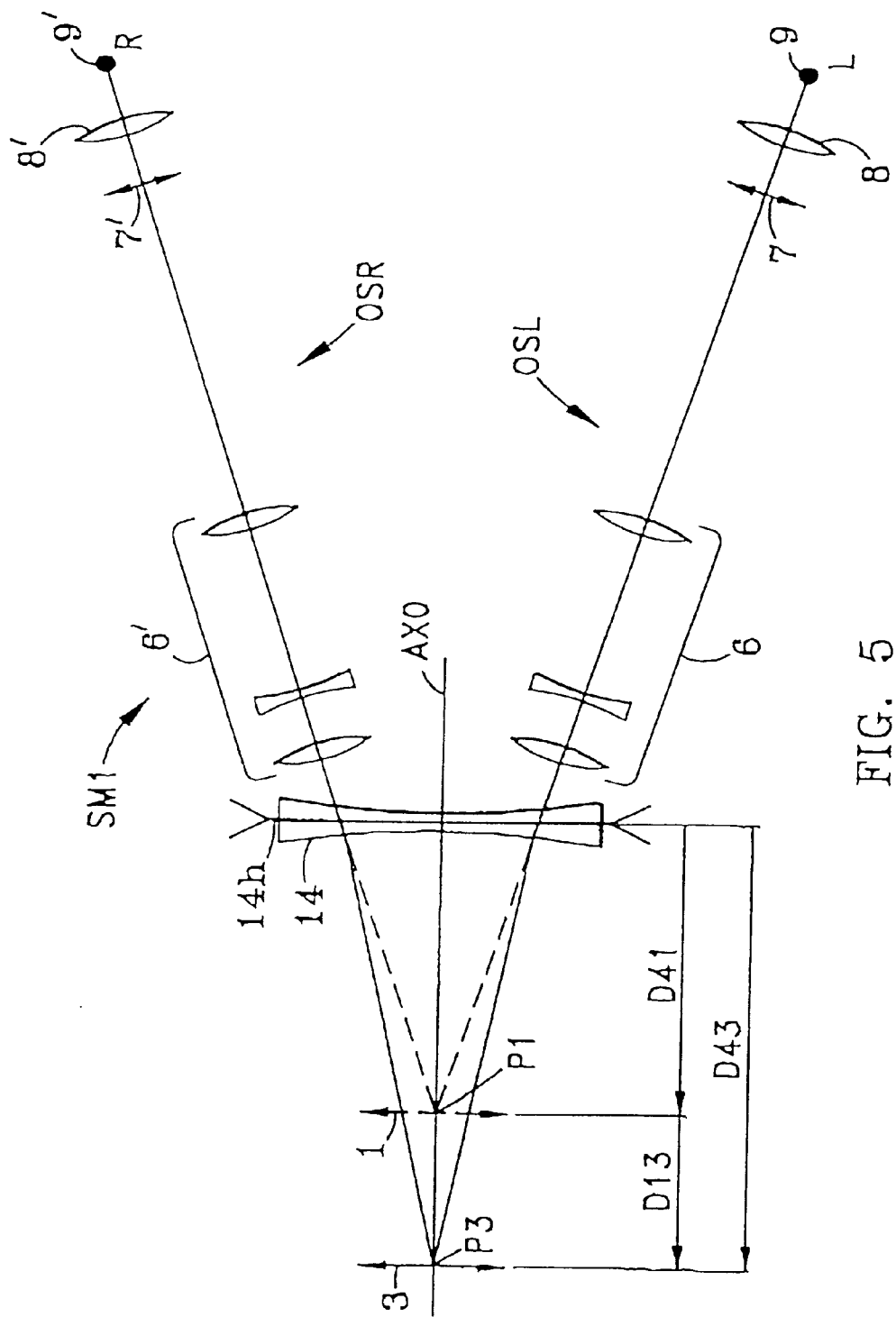
FIG. 5 is a schematic diagram of the related art optical system used for raising the eye-level of the conventional Greenough-type stereomicroscope shown in FIG. 4.
Figure 6:
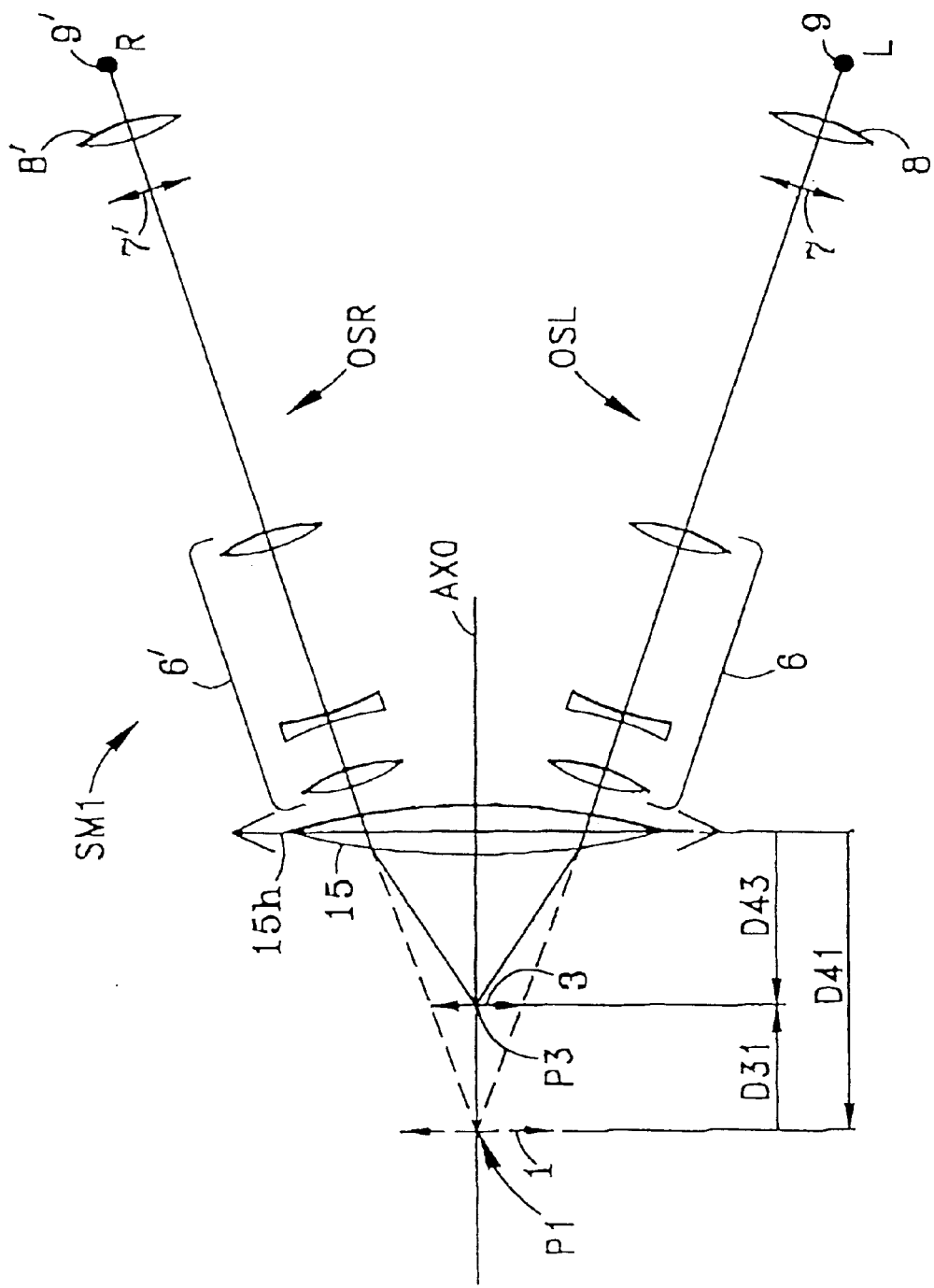
FIG. 6 is a schematic diagram of the related art optical system used for lowering the eye-level of the related art Greenough-type stereomicroscope shown in FIG. 4.

FIGS. 2 and 3 provide an example of an embodiment of the present invention. FIG. 2 is an optical diagram showing a Greenough-type stereomicroscope SM1 with adapter lens AL of the present invention adjusted to position eye-pieces 8 and 8' at the low-eye-level position. FIG. 3 is an optical diagram showing the same Greenough-type stereomicroscope with the adapter lens AL adjusted to position eye-pieces 8 and 8' at the high-level position. In FIGS. 2 and 3, the basic optical design of the independent optical systems OSR for the right eye and OSL for the left eye is the same as related art stereomicroscope SM1, as shown in FIG. 4. Images 7 and 7' of object 1 at position 3 are formed by imaging lens 6 and 6' (usually zoom lens), having magnification $\beta$, secured in a microscope superstructure 10 of the Greenough-type stereomicroscope. Images 7 and 7' are magnified by eyepiece lens 8 and 8', and are then observed by the naked eye of an observer (not shown) at eye-points 9 and 9'. Adapter lens AL is secured in an adapter lens holder 20. The observer side of adapter lens holder 20 is attachable to the imaging lens (6 and 6') side of tube 10 of stereomicroscope SM1.

In adapter lens AL, the distance (separation) between lenses 4 and 5 can be varied. The numerical data and the values corresponding to the Working Example are shown in Tables 1 and 2. In the Tables the dimension of length is mm.

TABLE 1A

NUMERICAL VALUES

| | | |
|---|---|---|
| f4 = −90 | D43L = 45 | $\beta 4L$ = D42L/D43L = 0.66666 . . . |
| f5 = 150 | D51H = 100 | $\beta 5L$ = D51L/D52L = 1.66666 . . . |
| D51L = 100 | D52H = 60 | $\beta 4H$ = D42H/D43H = 0.44444 . . . |
| D52L = 60 | D53H = 122.5 | $\beta 5H$ = D51H/D52H = 1.66666 . . . |
| D53L = 75 | D54H = 10 | |
| D54L = 30 | D42H = 50 | |
| D42L = 30 | D43H = 112.5 | |

TABLE 2

VALUES CORRESPONDING TO CONDITIONAL EXPRESSIONS

| | |
|---|---|
| (1) | $\beta 4L \times \beta 5L$ = 1.11111 . . . >1 |
| (2) | $\beta 4H \times \beta 5H$ = 0.74074 . . . <1 |
| (3) | D13L = D54L + D51L/($\beta 4L \times \beta 5L$) − D54L/$\beta 4L$ − D51L = −25 < 0 |
| (4) | D13H = D54H + D51H/($\beta 4H \times \beta 5H$) − D54H/$\beta 4H$ − D51H = 22.5 > 0 |
| (5), (6) | $|f4|/f5$ = 0.6 |

In the present embodiment, by changing the distance between positive lens 5 and negative lens 4, the magnification varies continuously from $\beta$=0.74074 at the high-eye-level position to $\beta$=1.11111 at the low-eye-level position. The eye-level can be varied continuously within the range from −25 to 22.5 mm, in comparison with the eye-level when the adapter lens AL is not attached.

In the present Working Example, a single lens element is used for positive lens 5, and also for negative lens 4. However, the present invention is not limited to single lens elements. It is possible, and may be preferable to use a plurality of lens elements for positive lens 5 and/or for negative lens 4, thus forming a positive and/or a negative lens group.

As is described above, according to the present invention, the eye-level can be easily varied continuously by means of attaching the adapter lens of the present invention in front of a Greenough-type stereomicroscope.

While the present invention has been described in connection with a preferred embodiment, it will be understood that it is not so limited. On the contrary, it is intended to cover all alternatives, modifications and equivalents as may be included within the spirit and scope of the invention as defined in the appended claims.

What is claimed is:

1. An adapter lens attachable to an imaging lens side of a Greenough stereomicroscope for viewing an object through eyepieces of the stereomicroscope arranged at an eyepiece level, the adapter lens comprising:

a first lens having positive refracting power; and a second lens having negative refracting power and separated from said first lens by a variable distance, wherein said distance is varied so as to continuously change the eyepiece level with respect to an object under observation between a first position and a second position;

said first position is a high-eye-level position representing a state where an eye point position along optical axes of eye-pieces of the stereomicroscope, equipped with said adapter lens, are placed at a farthest position from the object;

said second position is a low-eye-level position representing a state where said eye point position along the optical axes of the eye-pieces of the stereomicroscope, equipped with said adapter lens, are placed at a nearest position from the object;

at said low-eye-level position $\beta 4L \times \beta 5L > 1$, $D54L + D51L/(\beta 4L \times \beta 5L) - D54L/\beta 4L - D51L < 0$; and at said high-eye-level position $\beta 4 \times 5H < 1$, $D54H + D51H/($ $4H \times \beta 5H) - D54H/\beta 4H - D51H > 0$, wherein $\beta 4L$ represents a magnification of said second lens at said low-eye-level position, $\beta 5L$ represents a magnification of said first lens at said low-eye-level position, $\beta 4H$ represents a magnification of said second lens at said high-eye-level position, $\beta 5H$ represents a magnification of said first lens at said high-eye-level position, D54L represents a distance between a principal plane of said first lens and a principal plane of said second lens at said low-eye-level position, D54H represents a distance between said principal plane of said first lens and said principal plane of said second lens at said high-eye-level position, D51L represents a distance between said principal plane of said first lens at said low-eye-level position and an object position of the stereomicroscope not equipped with said adapter lens, and D51H represents a distance between said principal plane of said first lens at said high-eye-level position and said object position of the stereo microscope not equipped with said adapter lens.

2. An adapter lens attachable to an imaging lens side of a Greenough stereomicroscope for viewing an object through eyepieces of the stereomicroscope arranged at an eyepiece level, the adapter lens comprising:

a first lens having positive refracting power; and a second lens having negative refracting power and separated from said first lens by a variable distance, wherein said distance is varied so as to continuously change the eyepiece level with respect to an object under observation between a first position and a second position;

at said first position $|f4|/f5 < 1$; and wherein f5 is a focal length of said first lens and f4 is a focal length of said second lens.

3. An adapter lens attachable to an imaging lens side of a Greenough stereomicroscope for viewing an object through eyepieces of the stereomicroscope arranged at an eyepiece level, the adapter lens comprising:

a first lens having positive refracting power; and a second lens having negative refracting power and separated from said first lens by a variable distance, wherein said distance is varied so as to continuously change the eyepiece level with respect to an object under observation between a first position and a second position;

said first position is a high-eye-level position representing a state where an eye point position along optical axes of eye-pieces of the stereomicroscope, equipped with said adapter lens, are placed at a farthest position from the object;

said second position is a low-eye-level position representing a state where said eye point position along the optical axes of the eye-pieces of the stereomicroscope, equipped with said adapter lens, are placed at a nearest position from the object;

at said low-eye-level position $\beta 4L \times \beta 5L > 1$, $D54L + D51L/(\beta 4L \times \beta 5L) - D54L/\beta 4L - D51L < 0$;

at said high-eye-level position $\beta 4 \times \beta 5H < 1$, $D54H + D51H/(\beta 4H \times \beta 5H) - D54H/\beta 4H - D51H > 0$, wherein $\beta 4L$ represents a magnification of said second lens at said low-eye-level position, $\beta 5L$ represents a magnification of said first lens at said low-eye-level position, $\beta 4H$ represents a magnification of said second lens at said high-eye-level position, $\beta 5H$ represents a magnification of said first lens at said high-eye-level position, D54L represents a distance between a principal plane of said first lens and a principal plane of said second lens at said low-eye-level position, D54H represents a distance between said principal plane of said first lens and said principal plane of said second lens at said high-eye-level position, D51L represents a distance between said principal plane of said first lens at said low-eye-level position and an object position of the stereomicroscope not equipped with said adapter lens, and D51H represents a distance between said principal plane of said first lens at said high-eye-level position and said object position of the stereo microscope not equipped with said adapter lens;

at said first position $|f4|/f5 < 1$; and wherein f5 represents a focal length of said first lens and f4 represents a focal length of said second lens.

4. A method for adjusting the eye point level of a Greenough stereomicroscope having an imaging lens and an eye-point level, where the stereomicroscope is focused on an object under observation, said method comprising:

positioning at least one positive refracting power lens adjacent an object side of the imaging lens of the stereomicroscope;

positioning at least one negative refracting power lens adjacent said positive refracting power lens with a distance therebetween;

changing said distance so as to adjust the eye point level of the stereomicroscope;

positioning said at least one positive lens and said at least one negative lens in a moveable relationship with each other so as to allow the position of the eye point level to be varied continuously by moving said at least one positive lens and said at least one negative lens with respect to each other whereby the eye point level can be positioned at any point between a high-eye-level position wherein the eye piece is at a maximum distance from the object being observed to a low-eye-level position wherein the eye piece is at a minimum distance from the object being observed; and assuring that at the high-eye-level position the ratio of an absolute value of a focal length of said negative refracting power lens to the focal length of said positive refracting power lens is less than one.

5. A method for adjusting the eye point level of a Greenough stereomicroscope having an imaging lens and an eye-point level, where the stereomicroscope is focused on an object under observation, said method comprising:

positioning at least one positive refracting power lens adjacent an object side of the imaging lens of the stereomicroscope;

positioning at least one negative refracting power lens adjacent said positive refracting power lens with a distance therebetween;

changing said distance so as to adjust the eye point level of the stereomicroscope;

positioning said at least one positive lens and said at least one negative lens in a moveable relationship with each other so as to allow the position of the eye point level to be varied continuously by moving said at least one positive lens and said at least one negative lens with respect to each other whereby the eye point level can be positioned at any point between a high-eye-level position wherein the eye piece is at a maximum distance from the object being observed to a low-eye-level position wherein the eye piece is at a minimum distance from the object being observed;

assuring at the low-eye-level position that:

the product of the magnification of the positive lens and the negative lens in the low-eye-level position is greater than one, and $D54L+D51L/(\beta 4L \times \beta 5L)-D54L/(\beta L-D51L<0$;

assuring at the high-eye-level position that:

the product of the magnification of the positive lens and the negative lens in the high-eye-level position is less than one, and $D54H+D51H/(\beta 4H \times \beta 5H)-D54H/(\beta 4H-D51H>0$; and wherein D54L represents a distance between a principal plane of said positive lens and a principal plane of said negative lens at said low-eye-level position, D54H represents a distance between said principal plane of said positive lens and said principal plane of said negative lens at said high-eye-level position, D51L represents a distance between said principal plane of said positive lens at said low-eye-level position and an object position of the stereomicroscope not equipped with said adapter lens, and D51H represents a distance between said principal plane of said positive lens at said high-eye-level position and said object position of the stereomicroscope not equipped with said adapter lens.

6. A method for adjusting the eye point level of a Greenough stereomicroscope having an imaging lens and an eye-point level, where the stereomicroscope is focused on an object under observation, said method comprising:

positioning at least one positive refracting power lens adjacent an object side of the imaging lens of the stereomicroscope;

positioning at least one negative refracting power lens adjacent said positive refracting power lens with a distance therebetween;

changing said distance so as to adjust the eye point level of the stereomicroscope;

positioning said at least one positive lens and said at least one negative lens in a moveable relationship with each other so as to allow the position of the eye point level to be varied continuously by moving said at least one positive lens and said at least one negative lens with respect to each other whereby the eye point level can be positioned at any point between a high-eye-level position wherein the eye piece is at a maximum distance from the object being observed to a low-eye-level position wherein the eye piece is at a minimum distance from the object being observed;

assuring at the low-eye-level position that:

the product of the magnification of the positive lens and the negative lens in the low-eye-level position is greater than one, and $D54L+D51L/(\beta 4L \times \beta 5L)-D54L/(\beta L-D51L<0$;

assuring at the high-eye-level position that:

the product of the magnification of the positive lens and the negative lens in the high-eye-level position is less than one, and $D54H+D51H/(\beta 4H \times \beta 5H)-D54H/(\beta 4H-D51H>0$;

wherein D54L represents a distance between a principal plane of said positive lens and a principal plane of said negative lens at said low-eye-level position, D54H represents a distance between said principal plane of said positive lens and said principal plane of said negative lens at said high-eye-level position, D51L represents a distance between said principal plane of said positive lens at said low-eye-level position and an object position of the stereomicroscope not equipped with said adapter lens, and D51H represents a distance between said principal plane of said positive lens at said high-eye-level position and said object position of the stereomicroscope not equipped with said adapter lens; and assuring that at said high-eye-level position the ratio of an absolute value of the focal length of said negative refracting power lens to the focal length of said positive refracting power lens is less than one.

* * * * *